United States Patent [19]
Newman

[11] Patent Number: 6,041,740
[45] Date of Patent: Mar. 28, 2000

[54] FILTERING SYSTEM FOR FISH BOWLS WITH SEPARATED STAND, DRIVE AND PUMP SYSTEMS

[76] Inventor: Alfred T. Newman, 229 Marine Ave. Suite E, Balboa Island, Calif. 92662

[21] Appl. No.: 09/302,903

[22] Filed: Apr. 30, 1999

[51] Int. Cl.⁷ .................................................. A01K 63/00
[52] U.S. Cl. .......................................... 119/261; 119/253
[58] Field of Search ................................... 119/201, 245, 119/248, 253, 259, 261, 269; 210/169

[56] References Cited

U.S. PATENT DOCUMENTS

| | | | |
|---|---|---|---|
| D. 289,355 | 4/1987 | Paulides ................................... | D7/523 |
| D. 300,067 | 2/1989 | Smith et al. ............................. | D30/101 |
| 1,871,742 | 8/1932 | Sabath ..................................... | 119/253 |
| 3,168,887 | 2/1965 | Bodell ..................................... | 119/201 |
| 3,232,271 | 2/1966 | Dosamantes de Jose et al. ...... | 119/262 |
| 3,374,771 | 3/1968 | Michie et al. ........................... | 210/169 |
| 3,392,836 | 7/1968 | Willinger ................................. | 119/245 |
| 3,512,646 | 5/1970 | Willinger ................................. | 119/248 |
| 3,795,225 | 3/1974 | Ogui ........................................ | 119/255 |
| 4,117,805 | 10/1978 | Ward ....................................... | 119/246 |
| 4,148,730 | 4/1979 | Willinger ................................. | 210/169 |
| 4,272,372 | 6/1981 | Fonseca ................................... | 210/169 |
| 4,285,813 | 8/1981 | Stewart et al. .......................... | 210/169 |
| 4,481,905 | 11/1984 | Fonseca ................................... | 119/261 |
| 4,516,529 | 5/1985 | Lotito et al. ............................. | 119/253 |
| 4,703,720 | 11/1987 | Shipman et al. ........................ | 119/261 |
| 4,817,561 | 4/1989 | Byrne et al. ............................. | 119/260 |
| 4,978,444 | 12/1990 | Rommel .................................. | 119/260 |
| 5,174,239 | 12/1992 | Sato ........................................ | 119/253 |
| 5,693,220 | 12/1997 | Sceusa .................................... | 119/211 |
| 5,865,141 | 2/1999 | Poynter et al. ......................... | 119/245 |

*Primary Examiner*—Peter M. Poon
*Assistant Examiner*—Elizabeth Shaw
*Attorney, Agent, or Firm*—James G. O'Neill

[57] ABSTRACT

A filtering system for fish bowls and aquariums is held in a specifically formed cavity formed integrally at the bottom of the fish bowl or aquarium, which is held in a stand that supports and conceals the specifically shaped cavity and also hides an electric motor therein. The electric motor is magnetically coupled through a drive magnet held against the flat bottom of the bowl or aquarium to a driven magnet, having an impeller attached thereto, for recirculating water through the filter. A perforated top plate covers the filtering element, and includes a porous filter material therein to allow water to pass from a main body of water through the porous filter material and through the specifically-shaped cavity into a tubular central portion and out the tubular central portion back into the body of water. The stand both supports the bowl and conceals the motor, as well as a possible light source therein. In the assembled position, visually the bowl or aquarium will show nothing of any tubes, air stones, or the like, and will provide an aesthetically-pleasing bowl.

20 Claims, 3 Drawing Sheets

FILTERING SYSTEM FOR FISH BOWLS WITH SEPARATED STAND, DRIVE AND PUMP SYSTEMS

BACKGROUND OF THE INVENTION

1. Field of the Invention

This invention relates generally to fish bowls and aquariums, and, more particularly, to a specifically shaped fish bowl held on a decorative stand, which conceals a motor, magnetically coupled through the bottom of the bowl to actuate a filter system within the bowl.

2. Description of Related Art

As is well known, aquariums and fish bowls generally consist of a tank or vessel, that has transparent walls so that fish, or the like, held therein can be observed from the exterior. In order to keep the water in the aquarium from becoming toxic to the inhabitants, it is necessary to filter the water and maintain a constant amount of oxygen in the water.

It is also common to provide aquariums or fish bowls with suitable lighting, for the observation of the interior thereof. In order to achieve filtration of the water, ducts are brought into the water so that air may be bubbled into filter systems inside the aquarium or bowl.

The equipment to provide such filtration may also be hung on the side of the bowl or aquarium, or, in some cases, placed in a concealed compartment thereunder with ducts leading into the bottom through the gravel held therein.

Such equipment hung onto the bowls or aquariums and the devices used to aerate and filter the water from the bottom tend to spoil the appearance and attractiveness thereof, and tend to be expensive, requiring high upkeep and maintenance.

Examples of such prior art aquariums and bowls are shown in U.S. Pat. No. 3,232,271 to Dosamantes De Jose et al., U.S. Pat. No. 3,795,225 to Ogui, U.S. Pat. No. 4,117,805 to Ward which shows a vivarium having both an aquarium and a teranium in a chamber, U.S. Pat. No. 3,734,771 to Michie et al., U.S. Pat. No. 4,516,529 to Lotito et al., U.S. Pat. No. 4,148,730 to Willinger. U.S. Pat. No. 3,795,225 to Ogui shows an enclosed fish bowl with a centrally located water pump and aspirator surrounded by an annular water space 12. Water is drawn from the annular space 12 through a screen 38 and exit port 37, travels around cylinder 16, through openings 53 and into pump 20. Water is filtered and aerated by a central system and then flows out through openings 27, in to opening 52, and through inlet 36 and screen 38 into annular space 25. This patent, however, fails to teach or show the specific shape of a fish bowl as disclosed in the present invention, nor does it show a lower holding area for a filter, having an impeller which is magnetically driven by an electrical motor.

Other U.S. patents, such as U.S. Pat. No. 3,392,836 to Willinger, U.S. Pat. No. 3,512,646 to Willinger, and U.S. Pat. No. 4,285,813 to Stewart et al. show motors having a magnet on a rotor assembly which drives a further magnet having an impeller with a number of blades thereon. However, these patents fail to show the driving of a driven magnet through the closed bottom of a housing with the motor and drive magnet hidden by a base or stand supporting the fish bowl or aquarium.

Finally, different types of aquariums and aerating systems therefor are known, as shown in U.S. Pat. No. D300,067 to Smith et al., U.S. Pat. No. 4,272,372 to Fonseca, U.S. Pat. No. 4,817,561 to Byrne et al., U.S. Pat. No. 4,978,444 to Rommel, and U.S. Pat. No. 5,693,220 to Sceusa. These patents, however, do not show specific elements of the preferred embodiment of the fish bowl and separate magnetically-driven, filter system disclosed herein.

Therefore, there exists a need in the art for an improved, filtering system for unitary fish bowls and aquariums, which incorporates a stand that conceals an electric motor which is magnetically coupled through a solid bottom of the fish bowl, to a driven magnet having an attached impeller within a filter for circulating and cleansing the water within the bowl.

SUMMARY OF THE INVENTION

Accordingly, it is a general object of the present invention to provide an improved and simplified gold fish bowl. It is a particular object of the present invention to provide an improved and simplified gold fish bowl with a filter that is easier to maintain and operate and which is more aesthetically pleasing. It is another particular object of the present invention to provide a visually improved gold fish bowl or aquarium wherein none of the aerating systems, motors, or the like, are visible within the bowl. It is yet another particular object of the present invention to provide an improved gold fish bowl having a decorative stand which supports the bowl and conceals the motor and drive system, and may hold a light source therein. And, it is still another particular object of the present invention to provide an improved and simplified gold fish bowl or aquarium which is easily and quickly set up, and which will provide hours of enjoyment by the provision of a specifically shaped bowl having a lower portion held in a concealing stand, which contains a bottom filtering system actuated by an impeller that is magnetically coupled to an electric drive motor under the bottom of the fish bowl.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENTS

Figure 1:
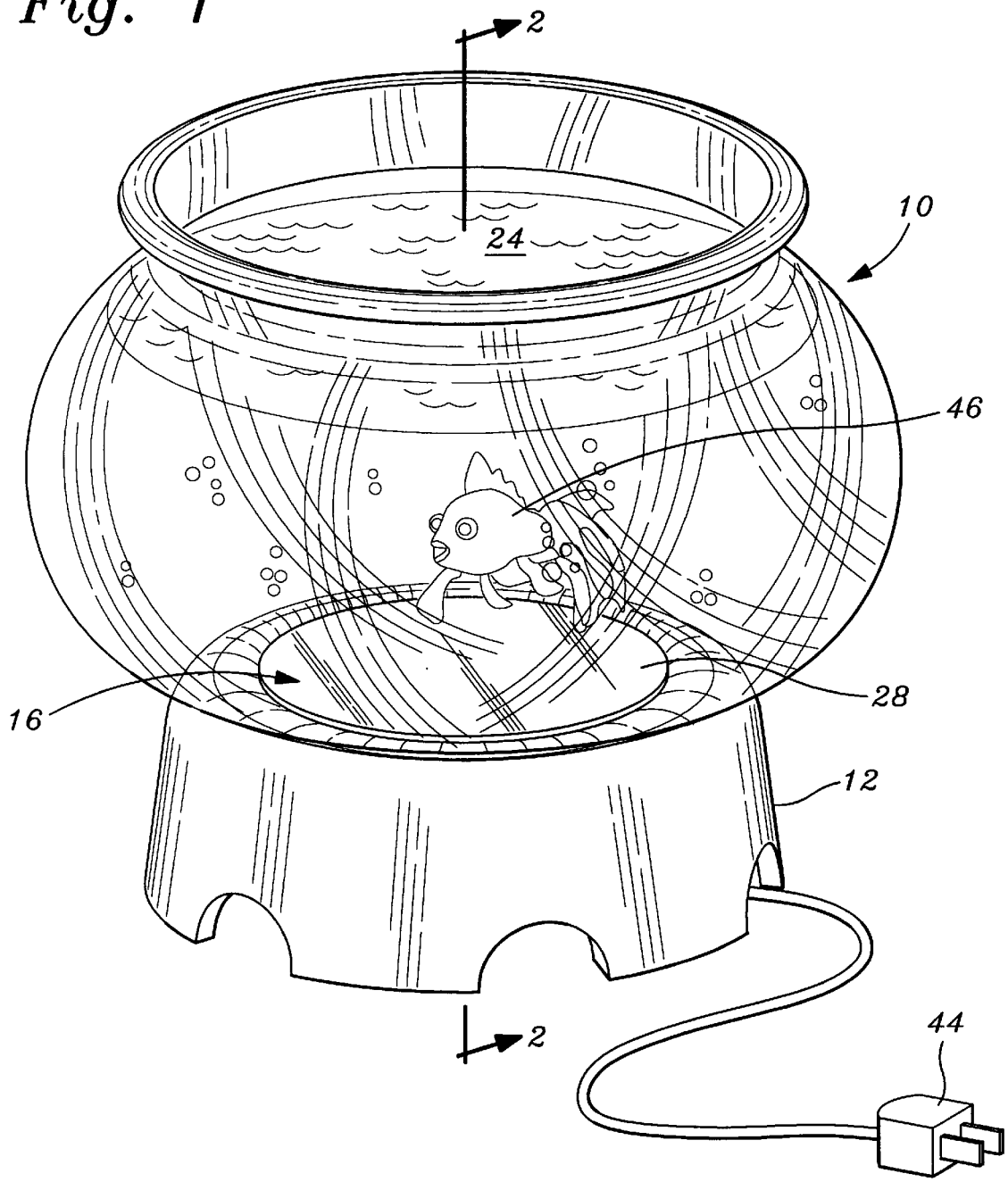
FIG. 1 is a perspective view of a preferred embodiment of a gold fish bowl of the present invention.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for a novel, improved and simplified unitary aquarium or gold fish bowl 10 supported in a decorative stand 12 made from wood, plastic, or the like, which conceals and holds a specifically shaped bottom portion 14 of the gold fish bowl 10, a filtering system 16, and an electrical motor 18 therein.

Figure 2:
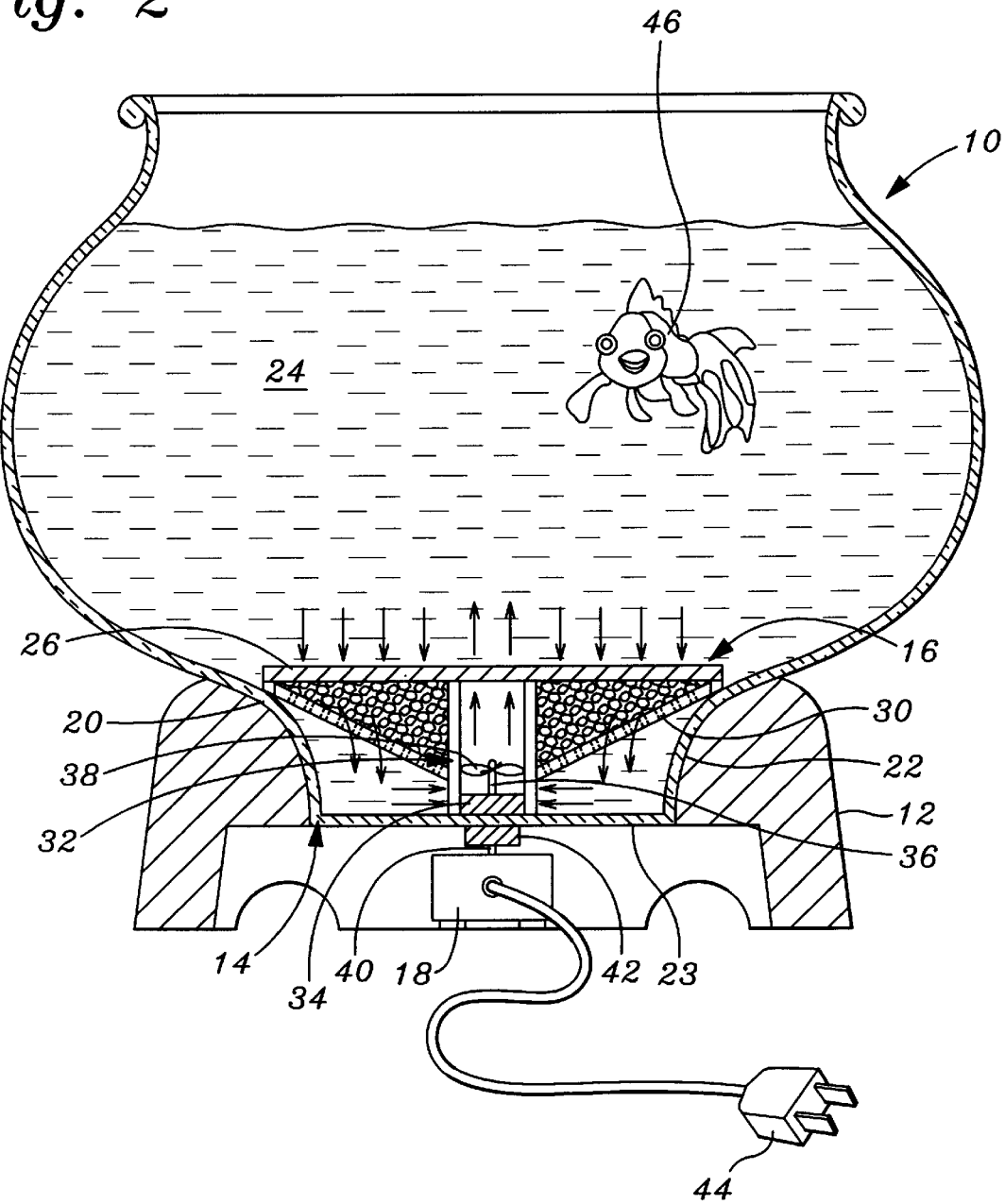
FIG. 2 is a cross sectional view of the gold fish bowl, bottom filter system, decorative stand electric drive motor, taken along line 2—2 of FIG. 1.
Figure 3:
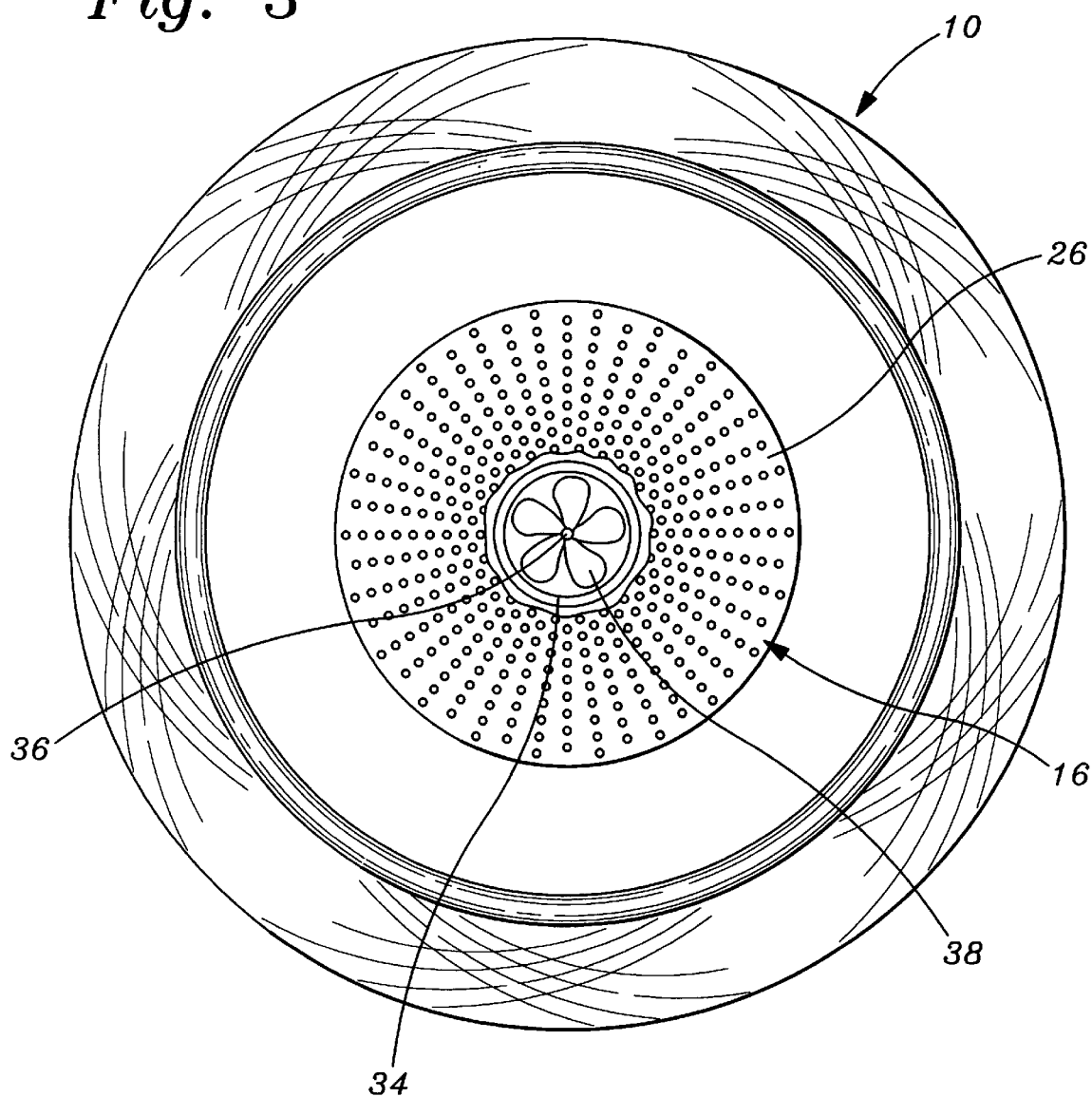
FIG. 3 is a top elevational view of the gold fish bowl of FIG. 1.

As shown most clearly in FIG. 2, the fish bowl or aquarium 10 is preferably a unitary, cylindrical or global-shaped, transparent bowl made from glass, plastic, or the like, having a large top portion and a smaller, tapered, specifically-shaped, lower portion 14. The smaller, lower portion preferably includes inwardly curved side walls or edges 20 around the outer periphery thereof. These outer side walls 20 are sized and dimensioned to cooperate with and fit into identically curved walls 22, which are formed on the stand 12 so as to capture, hold and support the lower section 14 and, therefore, the bowl 10 therein. The lower, hidden portion 14 includes a substantially flat, bottom or lower wall 23, that is solid, and water 24 is held in the lower portion 14 and the bowl 10, to any desired level.

A filtering assembly or system 16 is placed in the bottom of the bowl 10, and substantially completely held in the smaller, lower portion 14 so as not to be visible by an outside observer. The filter element 16 includes a perforated top plate 26, a standard filter material or media 28 held in a perforated dish or disk-shaped element 30, and a tubular central portion or element 32 having a driven means 34, such as a cylindrical magnet held therein. The cylindrical magnet 34 includes a shaft 36 centrally mounted thereon, connected to a multibladed impeller or propeller 38. Gravel, not shown, may be placed over the top of the perforated top plate to disguise or hide the filtering system 16 within the fish bowl 10.

The motor 18 held in the stand 12 includes a shaft 40 coupled to a drive means, such as a cylindrical drive magnet 42, of different polarity than the driven magnet 34. The motor 18 is actuated by house current from a plug 44, or may include a battery held within a compartment or housing formed in the motor 18, to operate the same.

Upon actuation of the motor 18 by the battery or house current, the drive magnet 42, which is held or pressed against the flat glass bottom 23 of lower bowl portion 14, will rotate and drive the driven magnet 34 so as to turn the impeller or propeller 38 and circulate water upwardly out of the tubular element 34 into the fish bowl 10. At the same time, the impeller 38 draws water down from the bowl, through the perforated top plate 26, down through the filter material or media 28, through the perforated dish-shaped element 30 and through openings in the tubular element 34 so as to be filtered and recirculated upwardly through the tubular element by the rotation of the magnet 34 and propeller 38.

A light source, not shown, may be provided in the stand 12 so as to shine upwardly through the bowl and illuminate any fish, or the like, 46 swimming within the bowl. This light may also be operated by house current, or via any battery held within a compartment in motor 18.

Although the fish bowl has been shown as circular, it is to be understood that the bowl 10 could take any desired shape, including oval or rectangular, so long as a lower shaped cavity or portion, such as 14, is formed therein and concealed by a substantially similar, central opening 22 formed in stand 12, so as to hide the same, and to allow a filtering system 16 to be inserted and held therein.

It will be apparent that while a preferred embodiment of the invention has been shown and described, various modifications and changes may be made without departing from the true spirit and scope of the invention. For example, while the filter element is described as having a dish-shaped element 30, any type of element, which could support the filtering material or media therein may be used, so long as there is sufficient room thereunder to form a cavity from which water may enter the lower portion of the tubular element for agitation and reinjection into the main body of water within the fish bowl. The filter element may also be made of a porous material that is rigid enough so that it does not need to be contained, and instead, is simply-shaped to fit around the tubular element.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An improved aquarium or fish bowl, comprising, in combination:

a unitary body made from a transparent material adapted to hold a supply of water therein;

the unitary body having a larger, upper portion with an open top, and a smaller, lower portion;

a stand having a central opening holding and supporting the smaller, lower portion therein;

a motor held within the central opening in the stand, below a solid bottom of the smaller, lower portion and coupled to an impeller held in the smaller, lower portion, without passing through the solid bottom; and a water filtering assembly held in the smaller, lower assembly, around the impeller.

2. The improved aquarium or fish bowl of claim 1 wherein the larger, upper portion is globe-shaped, and the smaller, lower portion is circular in shape.

3. The improved aquarium or fish bowl of claim 2 wherein the smaller, lower portion is completely held in a circular-shaped central opening in the stand so that it is not visible to a viewer regarding the improved aquarium or fish bowl.

4. The improved aquarium or fish bowl of claim 3 wherein the motor includes a circular drive magnet, and the impeller is secured to a circular driven magnet.

5. The improved aquarium or fish bowl of claim 4 wherein the water filtering assembly includes a perforated top plate facing the upper, larger portion, a perforated dish-shaped element supported in the smaller, lower portion, below the perforated top plate, and a porous filter media held in the perforated dish-shaped element, below the perforated top plate.

6. The improved aquarium or fish bowl of claim 5, further including a central tubular element mounted in the perforated top plate and the perforated dish-shaped element.

7. The improved aquarium or fish bowl of claim 6 wherein the circular driven magnet and the impeller are mounted in the central tubular element for pumping water from the smaller, lower portion into the larger, upper portion.

8. The improved aquarium or fish bowl of claim 7 wherein the central tubular element includes a plurality of openings through its surface.

9. The improved aquarium or fish bowl of claim 1 wherein the motor is coupled to the impeller by a drive magnet secured to the motor, and a driven magnet secured to the impeller.

10. The improved aquarium or fish bowl of claim 9 wherein the driven magnet and the impeller are held in a central tubular element.

11. The improved aquarium or fish bowl of claim 10 wherein the water filtering assembly includes a perforated top plate, held on the central tubular element, a perforated, dish-shaped element, held on the central tubular element below the perforated top plate, and a porous filter media held between the perforated top plate and the perforated dish-shaped element, around the central tubular element.

12. The improved aquarium or fish bowl of claim 11 wherein the smaller, lower portion is completely held in the central opening in the stand so as to not be visible to a viewer.

13. The improved aquarium or fish bowl of claim 12 wherein the larger, upper portion, the smaller, lower portion and the central opening in the stand are circular.

14. An improved aquarium or fish bowl, comprising, in combination:

a unitary transparent body having a circular, larger, upper body portion, with an open top and a circular, smaller, lower body portion, adapted to hold a supply of water therein;

the circular, smaller, lower body portion, ending in a substantially flat, solid bottom;

a stand having a central circular opening, sized and dimensioned to hide and hold the circular, smaller, lower body portion, and to support the circular, larger, upper body portion;

a motor having a drive magnet coupled thereto held in the central circular opening, below the substantially flat, solid bottom, with the drive magnet contacting a lower surface of the substantially flat, solid bottom; and an impeller having a driven magnet thereon, held in a water filtering assembly, mounted in the circular, smaller, lower body portion.

15. The improved aquarium or fish bowl of claim 14 wherein the water filtering assembly includes a perforated top plate facing the upper, larger portion, a perforated dish-shaped element supported in the smaller, lower portion, below the perforated top plate, and a porous filter media held in the perforated dish-shaped element, below the perforated top plate.

16. The improved aquarium or fish bowl of claim 15, further including a central tubular element mounted in the perforated top plate and the perforated dish-shaped element.

17. The improved aquarium or fish bowl of claim 16 wherein the drive magnet and the driven magnet are cylindrical, and the impeller and the cylindrical driven magnet are mounted in the central tubular element.

18. The improved aquarium or fish bowl of claim 17 wherein the central tubular element includes a plurality of openings through its surface.

19. The improved aquarium or fish bowl of claim 18 wherein the motor is electrically operated, and the stand is made from a rigid, durable material.

20. An improved aquarium or fish bowl, comprising, in combination:

a unitary transparent body having a circular, larger, upper body portion, and a circular, smaller, lower body portion, adapted to hold a supply of water therein;

the circular, smaller, lower body portion ending in a substantially flat, solid glass bottom;

a stand having a central circular opening, sized and dimensioned to hide and hold the circular, smaller, lower body portion, and to support the circular, larger, upper body portion;

an electric motor having a drive magnet coupled thereto held in the central circular opening, below the substantially flat, solid bottom, with the drive magnet contacting a lower surface of the substantially flat, solid bottom;

an impeller having a plurality of blades and a driven magnet thereon, held in a water filtering assembly, mounted in the circular, smaller, lower body portion; and the water filtering assembly includes a perforated top plate, held on a central tubular element, a perforated, dish-shaped element held on the central tubular element below the perforated top plate, and a porous filter media held between the perforated top plate and the perforated dish-shaped element, around the central tubular element.

* * * * *